Sept. 8, 1959      S. M. WAAS      2,902,920

KETTLE ASSEMBLY FOR POPCORN MACHINES

Filed June 18, 1956      2 Sheets-Sheet 1

INVENTOR.
Samuel M. Waas
BY
ATTORNEY

Sept. 8, 1959 S. M. WAAS 2,902,920
KETTLE ASSEMBLY FOR POPCORN MACHINES
Filed June 18, 1956 2 Sheets-Sheet 2
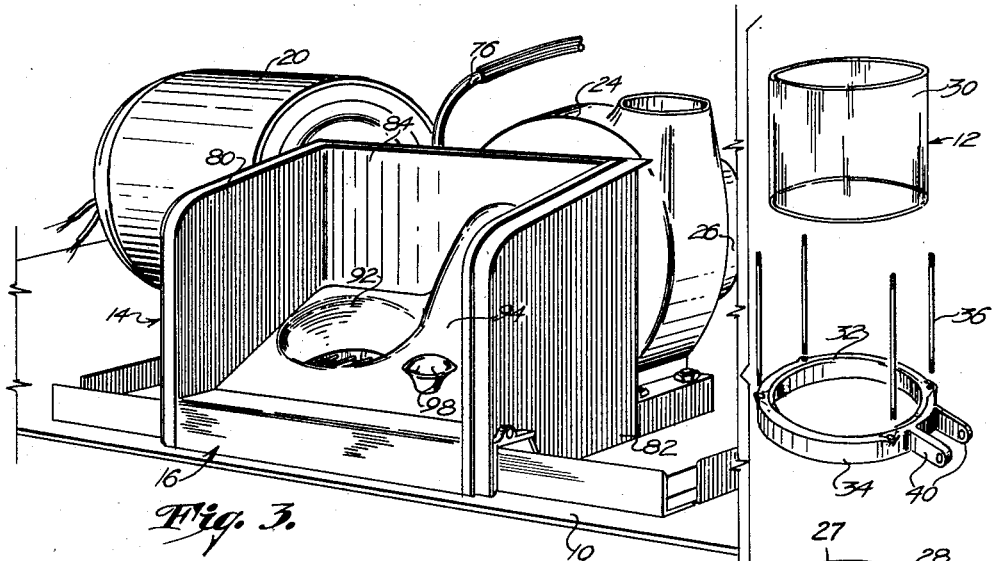
INVENTOR.
Samuel M. Waas
BY
ATTORNEY

United States Patent Office 2,902,920
Patented Sept. 8, 1959

2,902,920
KETTLE ASSEMBLY FOR POPCORN MACHINES
Samuel M. Waas, Kansas City, Mo., assignor to Manley, Inc., Kansas City, Mo., a corporation of Missouri
Application June 18, 1956, Serial No. 592,028
2 Claims. (Cl. 99—238.4)

This invention relates to improvements in popcorn machines and more particularly to the kettle assembly thereof, including not only the chamber within which the corn is popped but assoicated parts for delivery of corn, salt and seasoning thereto, mechanism for dumping the popped corn, an assembly for agitating the corn within the kettle during popping, and means for evacuating the popping chamber of steam.

One of the better inducements to the purchase of popcorn relates to the interest in the popping operation itself; therefore, it is an important object of the present invention to provide a kettle assembly for popcorn machines that includes parts for making it possible for potential purchasers to view the corn being popped through the medium of transparent tubular structure forming a part of the kettle assembly.

Another important object of the instant invention is to provide an improved assembly for popcorn machines that contemplates introduction of the raw corn into the popping chamber through a hopper at the top thereof, into which is also dumped the salt while the agitator is rotating and after closing of the kettle itself with respect to a transparent tube, beneath which the kettle is swingably mounted.

Still another important object of the instant invention is to provide in the rotatable agitator assembly means for introduction of the liquid seasoning to the kettle from a pump unit forming a part of the machine.

Other objects include the way in which the kettle is swung to and from a closed position through the medium of crank mechanism pivotally and operably interconnecting a suitable prime mover and a lateral extension on the kettle; the way in which a removable hood is provided above the tubular structure presenting the aforementioned hopper and providing means for placing an exhaust fan into communication with the uppermost end of the transparent tube; and many additional objects, including important details of construction to be made clear as the following specification progresses.

Figure 1:
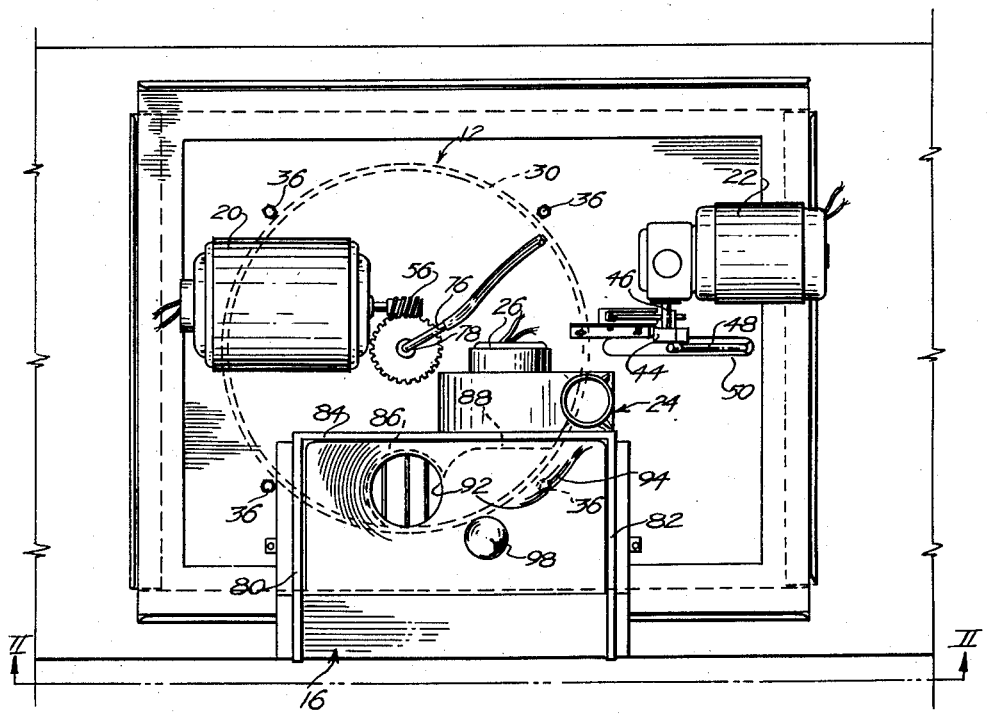
Figure 2:
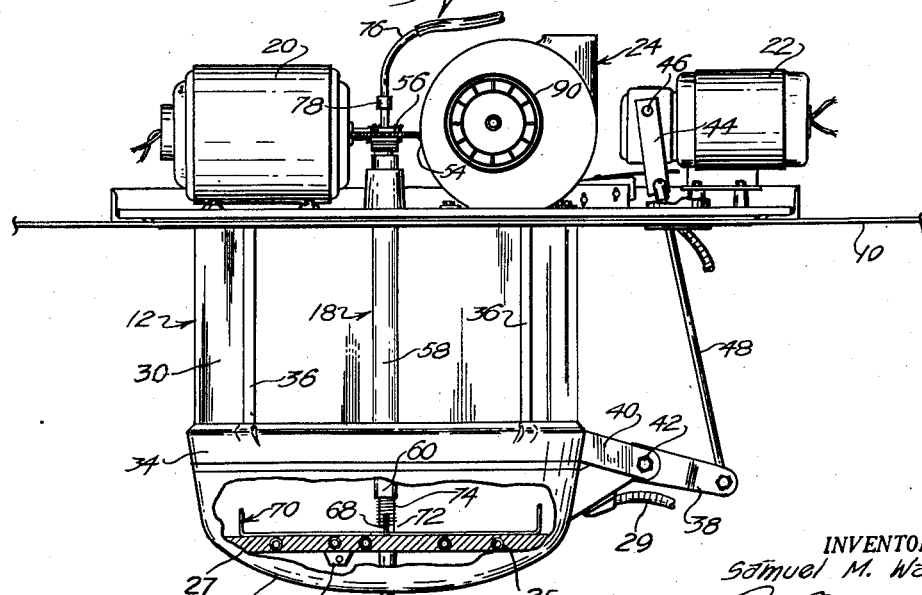

In the drawings:
Figure 1 is a top plan view of a popcorn machine showing the cover thereof removed and illustrating the improved kettle assembly forming the subject matter of the present invention;
Fig. 2 is a side elevational view of the aforementioned kettle assembly;
Fig. 3 is a perspective view above the support that carries the entire assembly;
Fig. 4 is a stretched-out perspective view showing the tubular structure and kettle entirely removed from the said support;
Fig. 5 is a rear perspective view of the removable hood;
Fig. 6 is an enlarged, vertical, cross-sectional view through the rotatable agitator assembly;
Fig. 7 is an enlarged, fragmentary, perspective view of the uppermost end of the kettle operating crank mechanism; and Fig. 8 is a fragmentary, perspective view of the removable agitator.

The kettle assembly about to be described is mounted within the uppermost end of a cabinet (not shown) through the medium of an overhead horizontal support 10 which carries open bottom tubular structure 12, a housing 14 for a hollow hood 16, an agitator assembly 18, a pair of prime movers such as electric motors 20 and 22, fluid exhaust means 24 driven by an electric motor 26, and a popping kettle 28 that is carried by the support 10 through the tubular structure 12.

Structure 12 includes an elogated, transparent, preferably cylindrical tube 30 that is seated at the lowermost end thereof within an annulus 32 forming a part of a ring 34. Ring 34 is suspended from the support 10 to clamp the tube 30 between the ring 34 and the support 10 through the medium of a plurality of rods 36.

The electrically heated kettle 28 is provided with a lateral extension 38 received between a pair of ears 40 extending radially from the ring 34, and a pivot pin 42 passing through the ears 40 and the extension 38 swingably mounts the kettle 28 on the structure 12 for movement to and from a closed position seated against the lowermost periphery of the ring 34 as shown in Fig. 2.

The mechanism for imparting swinging movement to the kettle 28 includes a crank 44 rigid to output shaft 46 that is driven by motor 22, together with a rod 48 pivotally interconnecting the outermost ends of crank 44 and extension 30, it being noted that support 10 is provided with a slot 50 clearing the rod 48.

The agitator assembly 18 includes an elongated, rotatable conduit 52 having a worm gear 54 attached thereto and meshing with a worm 56 on the output shaft of motor 20. A pipe 58 together with a pair of sleeves 60 and 62 enclose the conduit 52 beneath the support 10, sleeves 60 and 62 being removably attached to the conduit 52. A reduced length 64 on the lowermost end of the sleeve 60 is provided with a slot 66 that receives cross member 68 of an agitator broadly designated by the numeral 70. A cotter key or the like 72 releasably holds the agitator 70 by passing beneath the cross member 68 and a spring 74 coiled about the extension 64 yieldably holds the cross member 68 against the cotter key 72.

Seasoning is introduced into the kettle 28 by way of conduit 52 through the medium of a liquid pump (not shown) coupled with a tubular passage 76 joined to the upper end of the conduit 52 through a slip coupling 78.

The hollow hood 16 fits within the three walls of open top and open front housing 14 between side walls 80 and 82 and against rear wall 84 of the housing 14. Support 10 is provided with an opening 86 beneath the hood 16, the opening 86 communicating with the uppermost end of transparent tube 30.

Hood 16 also communicates with a hole 88 in the rear wall 84 lined directly with inlet 90 of exhaust fan 24. Hood 16 is provided with a corn and salt receiving hopper 92 registering with the opening 86 and with a hollow portion 94 that places the fan 24 into communication with the popping chamber formed by tube 30, it being noted that hood 16 is in covering relationship to both opening 86 and hole 88. A suitable filter 96 within the hollow portion 94 of hood 16 is held against displacement by virtue of the action of fan 24 through a screen 99 carried by the hood 16.

After the kettle 28 which is thermostatically controlled has been heated to a predetermined temperature, motor 20 is energized to rotate conduit 52 and therefore, agitator 70. Fig. 2 shows electric heating coils 25 in flat bottom 27 of kettle 28, extension 29 for coupling coils 25 with a source of electrical energy (not illustrated) and thermostat 31 for controlling the temperature of kettle 28. With the kettle 28 closed as shown in Fig. 2, the corn to be popped is charged into the kettle 28 manually through the hopper 92 and the latter may also be used for manual introduction of salt. Liquid seasoning is pumped into the kettle 28 through the passage 76 and conduit 52, emptying into the kettle 28 through the lowermost open end of the extension 64 of sleeve 60. At the same time the prime mover 26 is energized to operate exhaust fan 24 and continually evacuate the tube 30 of steam which passes through the filter 96, which is made of material capable of removing greases and oils.

The popping operation is readily visible through the transparent tube 30 and it has been found that the sight of the popping kernels as well as the rising popcorn within the tube 30 creates considerable interest.

Additionally, the operator can easily determine when all of the corn has popped and thereupon, through merely closing a suitable electric switch (not shown) prime mover 22 is energized to swing the kettle 28 downwardly through the crank mechanism 44—48, thereby discharging the popcorn into the cabinet within which the entire kettle assembly is mounted.

It is seen that the agitator 70 remains attached to the assembly 18 during the dumping operation. The mounting of the agitator 70 is of itself novel, since agitator 70 is free to swing as well as move vertically against the action of the spring 74. The bottom 27 of the kettle 28 is therefore always in contact with the agitator 70 and kernels of corn will readily pass therebeneath without damage to the agitator assembly. Still further, the agitator 70 may be readily removed for cleaning simply by removal of the cotter key 72. The kettle 28 and the tube 30 are likewise easily cleaned when kettle 28 is swung downwardly to the open position. Cleaning of the hood 16 and associated parts as well as changing of the filter 96 is facilitated by virtue of the removability of hood 16 from its housing 14 through use of knob 98 on hood 16.

Having thus described the invention what is claimed as new and desired to be secured by Letters Patent is:

1. In a popcorn machine, in combination, a horizontal support having an opening; a transparent, cylindrical tube open at its top and bottom and disposed beneath the support in registry with said opening; a ring at the lowermost end of the tube upon which the latter is supported; rods releasably connecting the ring and the support for clamping the tube between the ring and the support; a kettle carried by the support for swinging movement on a horizontal axis to and from a closed position seated against the ring; heating means in said kettle; a rotatable seasoning conduit depending from the support into the tube; an agitator attached to the conduit for rotation therewith and disposed in the kettle only when the latter is closed; a pair of prime movers carried by the support; means operably connecting one of the prime movers with the conduit for rotating the latter; means operably connecting the other prime mover with the kettle for opening and closing the latter; a hollow hood covering the opening and resting on the support, said hood having a corn-receiving hopper registering with the opening; a fan mounted on the support and communicating with the hood for exhausting steam from the tube and the kettle; and a filter carried by the hood between the fan and the opening for removing greases and oils from the steam.

2. The invention of claim 1, wherein is provided a housing rigid to said support partially encompassing the hood and holding the latter in place, the housing having a wall between the hood and the fan provided with a hole placing the hood into communication with the fan, the hood being readily removable from the housing and support.

References Cited in the file of this patent

UNITED STATES PATENTS

| | | |
|---|---|---|
| 1,658,486 | Howe | Feb. 7, 1928 |
| 2,027,698 | Parks et al. | Jan. 14, 1936 |
| 2,034,484 | Pagendarm | Mar. 17, 1936 |
| 2,232,954 | Manley | Feb. 25, 1941 |
| 2,586,347 | Kloster | Feb. 19, 1952 |